Oct. 12, 1965  H. J. SCHWERDHÖFER  3,211,023
DUAL SPEED HUB
Filed July 31, 1962  4 Sheets-Sheet 1

INVENTOR:
HANS JOACHIM SCHWERDHÖFER

INVENTOR:
HANS JOACHIM SCHWERDHÖFER

INVENTOR:
HANS JOACHIM SCHWERDHÖFER

Oct. 12, 1965     H. J. SCHWERDHÖFER     3,211,023
DUAL SPEED HUB

Filed July 31, 1962                            4 Sheets-Sheet 4

INVENTOR:
HANS JOACHIM SCHWERDHÖFER

United States Patent Office
3,211,023
Patented Oct. 12, 1965

3,211,023
DUAL SPEED HUB
Hans Joachim Schwerdhöfer, Schweinfurt (Main), Germany, assignor to Fichtel & Sachs A.G., Schweinfurt (Main), Germany, a corporation of Germany
Filed July 31, 1962, Ser. No. 213,708
Claims priority, application Germany, Aug. 5, 1961, F 34,614
13 Claims. (Cl. 74—750)

This invention relates to a hub for the driven wheel of bicycles, motorcycles, and the like, and more particularly to a duel speed hub in which the speed change is effected by an internal speed-changing mechanism actuated by reverse pressure on the driven input member of the hub.

In known dual speed hubs, motive power is transmitted from pedals or an engine to a sprocket wheel which is fixedly connected to a driver member that is rotatable about a stationary hub shaft secured to the bicycle frame. The driver member is partly enveloped by a hub shell. A portion of the driver member projects beyond the hub shell and carries the sprocket wheel over which a drive chain is trained. The driver member is disposed between the sprocket wheel and planetary gearing means which consist essentially of a sun wheel, a planet wheel carrier, and planet wheels. The planetary gearing transmits rotary motion of the driver member to the hub shell. Wire spokes on the hub shell carry the rim of the driven bicycle wheel.

Bicycle hubs in which a speed change is initiated by back pedaling are known.

In a known construction of a dual speed hub, the speed change is effected over a system of cams and eccentrics, which acts upon a group of pawls. This construction has the disadvantage that it requires control, cam, and eccentric means, as well as compression springs and friction discs, in addition to the conventional drive parts, which increases the initial cost considerably.

In another known construction, the speed change mechanism consists of three pawl systems in a side-by-side arrangement. For each speed, a particular pawl system is required. The speed change is effected over a control sleeve and added control parts and springs. This construction is complicated and expensive.

The present invention aims at eliminating the referred to disadvantages of known constructions and at providing an improved dual speed hub having two aggregates of driving means, with or without coaster brake, and wherein a change in speed is effected by back pedaling.

These objects and such other objects of my present invention as will be apparent from the following description are achieved by providing a dual speed hub for the driven wheel of bicycles, motorcycles, and the like, which includes a driver member, a hub shell, and a power transmission elements between the driver member and the hub shell planetary gearing means having a member, a toothed face on said member, pawl carrier means, ratchet means, and two sets of pawls which are referred to hereinafter as first and second pawls. The toothed face is provided either on a ring gear of the planetary gearing means or on a part connected to the ring gear, and both the so-called first and so-called second pawls are carried by the pawl carrier. The first pawls engage said toothed face, while the second pawls engage the ratchet means and are formed to block motion in a direction opposite to the motion-blocking action of the first pawls. The second pawls engage the toothed face axially and are included in or excluded from the power transmission by backward turning said driver member and gear member.

The specification is accompanied by drawings which show by way of example a number of embodiments of this invention and in which.

Figure 1:
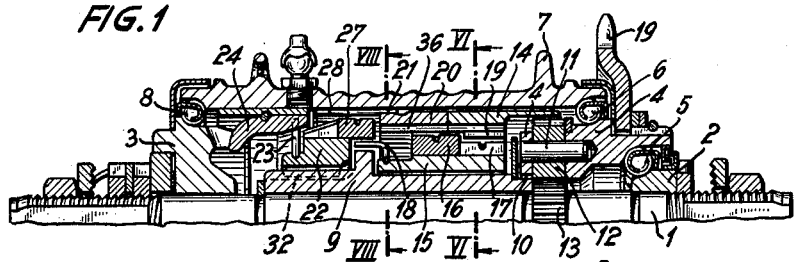
FIG. 1 is a sectional elevation of one half of a dual speed hub according to the invention, designed for direct and high-speed gear and shown to be in direct gear.
Figure 2:
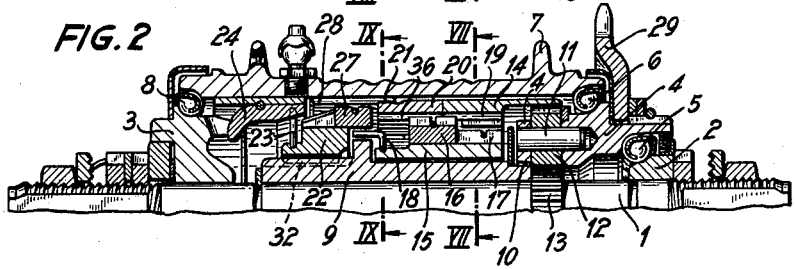
FIG. 2 shows the hub of FIG. 1, set for high-speed operation.

Referring to the drawings in greater detail, and initially to FIGS. 1 and 2, there is shown a rear wheel hub of a bicycle of conventional external appearance. The working elements of the hub are mounted on a stationary shaft 1 which is adapted to be clamped in a fork of a bicycle frame. Most of the hub elements are enclosed in a hub shell 7 which extends coaxially with the shaft 1 and is rotatable. Over a sprocket 29 which projects beyond the hub shell, a drive chain is trained. Motive power is transmitted from pedals or an engine to the sprocket which is fixedly connected to a driver member 4 that is rotatable about the shaft 1.

In the embodiment shown, the driver member 4 forms an outer race for a ball bearing 5 and an inner race for a ball bearing 6. There are two bearing members 2 and 3 spacedly fixed to the shaft 1. The bearing member 3 forms an inner race for a ball bearing 8. The hub shell 7 is supported by the ball bearings 6 and 8. The driver member 4 is formed as a planet wheel carrier of a planetary gearing and is connected over a coupling 10 with an internal driver member 9. The latter rotates about the shaft 1. The driver member or planet wheel carrier 4 supports pins 11 on which planet wheels 12 are mounted. The planet wheels mesh with a sun wheel 13 fixed to the shaft 1, and with a ring gear 14 of the planetary gearing.

Rotatable about the internal driver member 9 is a pawl carrier 15 on which pawls 16, pawls 17, and a friction spring 18 are provided. The ring gear 14 is provided with a toothed face 19 which is engaged by and actuates the pawls 17 and thus the pawl carrier 15. The toothed face 19 cooperates also with the pawls 16 and causes same either to engage a ratchet ring 20 and its toothing 36, or to disengage from the ratchet ring 20 and the toothing 36. The ratchet ring 20 is connected to the hub shell 7 over a lost motion coupling 21.

Seated on the interior driver member 9, besides the pawl carrier 15, is in the case of a hub with coaster brake (FIGS. 1 and 2) a brake cone 22 which is connected over a friction spring 23 to a brake sleeve 24 or the like. There are pawls 27 on the brake cone 22, which engage ratchet teeth 28 on the hub shell 7.

Figure 3:
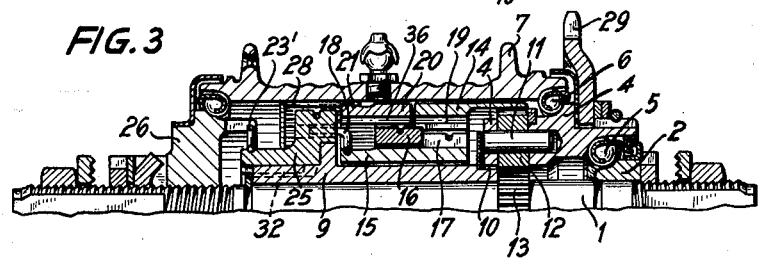
FIG. 3 shows one half of a section of another embodiment of the invention.

In FIG. 3, a hub is shown which is like that of FIGS. 1 and 2, except that there is no coaster brake but a lock 25 instead which engages with a friction spring 23′, for instance, a slot in a cone 26. The lock 25 may even be dispensed with when a fixing of the gears on backward pedaling is not desired.

Figure 4:
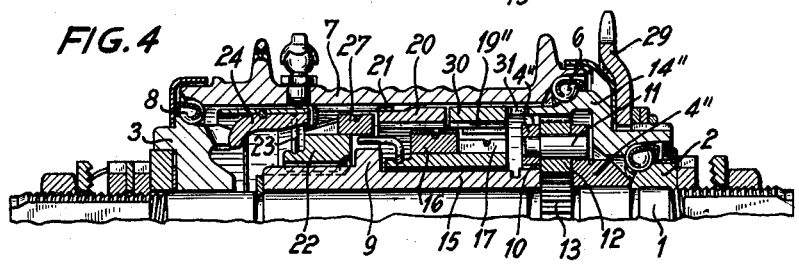
FIG. 4 shows one half of a section of a further embodiment of the invention.

The embodiment of FIG. 4 differs from the construction of FIGS. 1 and 2 in employing not the planet wheel carrier but a cup-shaped ring gear of the planetary gearing as the driver member. In FIG. 4, the ring gear is designated 14″ and is connected to the sprocket 29. The toothed face 19″ is therefore not provided on the ring gear 14″ but on a ring 30 which is an additional part and is connected to the ring gear by a coupling 31.

The operation of the hubs shown in FIGS. 1 to 4 is as follows:

FIGS. 1 to 3 show a dual speed hub according to the invention with two aggregates of driving means. While the embodiment of FIGS. 1 and 2, as has been indicated, includes a coaster brake, the embodiment of FIG. 3 does not. A change in speed is effected on backward pedaling by a relative movement of the rotating ring gear and the nonrotating pawl carrier.

Figure 6:
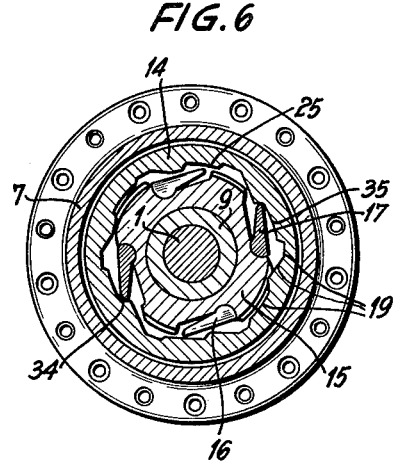
FIG. 6 is a section taken in the plane of the line VI—VI of FIG. 1.

In FIGS. 1, 3 and 6, the dual speed hub is shown in direct gear condition. The power transmission train includes a driver member which is constituted by the planet wheel carrier 4. The planet wheel carrier is connected o one side to the sprocket 29, and on the other side to the interior driver member 9 over any suitable coupling 10. It drives the interior driver member. In the case of FIGS. 1 and 2, driven with the interior driver member 9 are the brake cone 22 connected therewith, the pawls 27, the ratchet 28, and the hub shell 7. In the case of FIG. 3, driven with the interior driver member 9 are the lock 25, again the pawls 27, ratchet 28, and hub shell 7. The connection between the interior driver member 9 and the brake cone 22 and the lock 25, respectively, is effected by a thread 32, but any other connecting means which will cause axial or rotary movement, as needed for braking or locking actions, may be used as well. Known for this purpose are ascending teeth, clamp rolls, clamp balls.

During braking, the transmission of power is the same as in direct gear. The brake cone 22 is prevented from turning, which would otherwise be caused by the turning interior driver member 9, by the friction spring 23. Due to the thread 32, the nonturning brake cone 22 is moved toward the brake sleeve 24 so that an inclined face of the brake cone will press tightly against a matingly shaped face of the brake sleeve 24, causing the latter to act upon the hub shell 7 as a brake. It will be apparent that other braking means may be used instead of a brake sleeve.

The hub of FIGS. 1 to 4 being equipped with a back pedaling speed change mechanism, back pedaling during braking will cause a speed change. There are two possibilities to be mentioned in this connection. Either there is the provision that a speed change is effected prior to braking, or the originally set speed is restored briefly before the start of the braking action. This is made possible by a corresponding axial groove between the braking elements or by a corresponding selection of a turning angle for the speed change and the braking action, respectively. During freewheeling, it is only the hub shell 7 which runs on freely on the ball bearings 6 and 8, while all working parts of the hub are at a standstill. The pawls 16 and 27 do not operate.

FIG. 2 shows the hub of FIG. 1, upon shifting gears, set for high-speed. The planet wheel carrier 4 is again driven by the sprocket 29, and the planet wheels 12 mesh with the sun wheel 13, and transmit to the ring gear 14 a higher speed. On the ring gear, there is provided, as has already been stated, the toothed face 19 which is engaged by the pawls 17 and gives the pawl carrier 15 in each of the two great positions a higher speed.

The shifting and succession of movements of the toothed face 19 for driving and speed control and of the pawls 16 and 17 are best shown in FIGS. 6 to 13.

Figure 7:
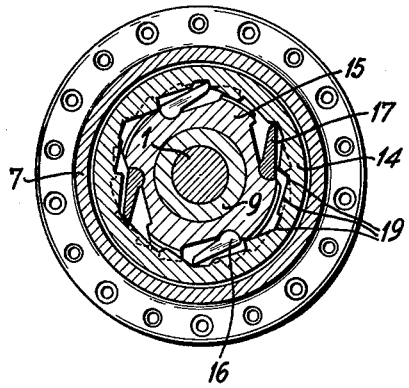
FIG. 7 is a section taken in the plane of the line VII—VII of FIG. 2.
Figure 11:
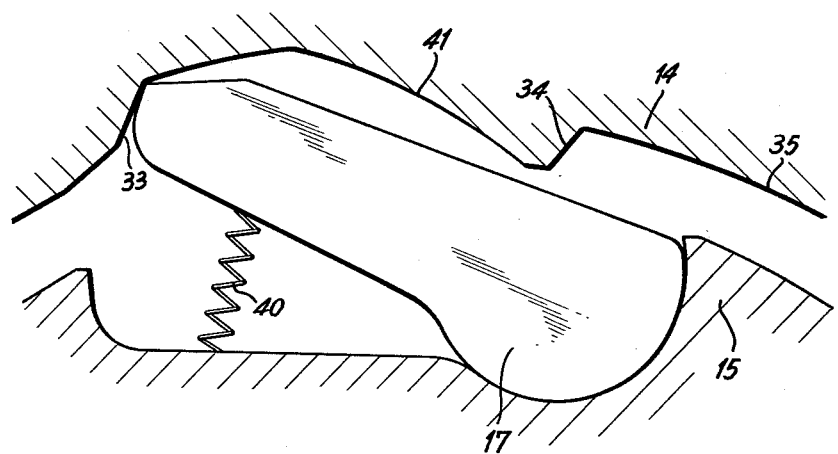
FIG. 11 is a view similar to that of FIG. 10 and is explanatory of the engagement of the toothed face by the pawl in a different speed position.
Figure 10:
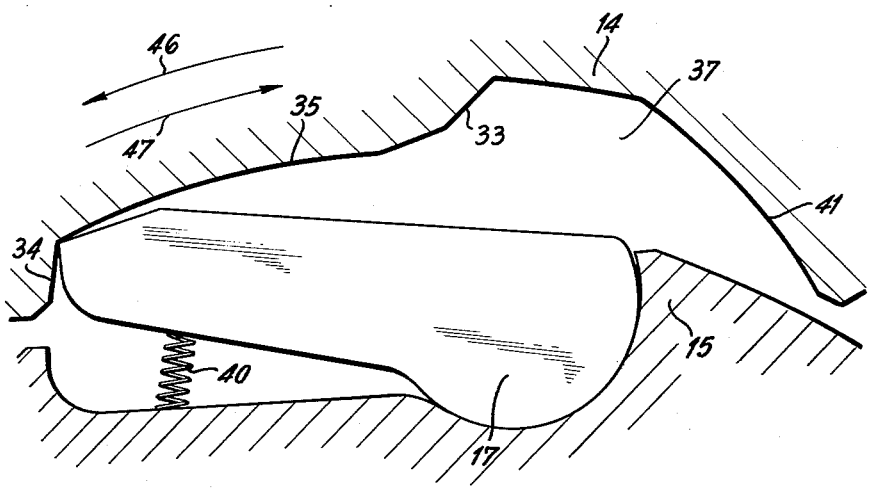
FIG. 10 shows in a fragmentary view an embodiment of a toothed face on a part of the hub of FIGS. 1 to 3, and a pawl engaging the toothed face, drawn to enlarged scale.
Figure 12:
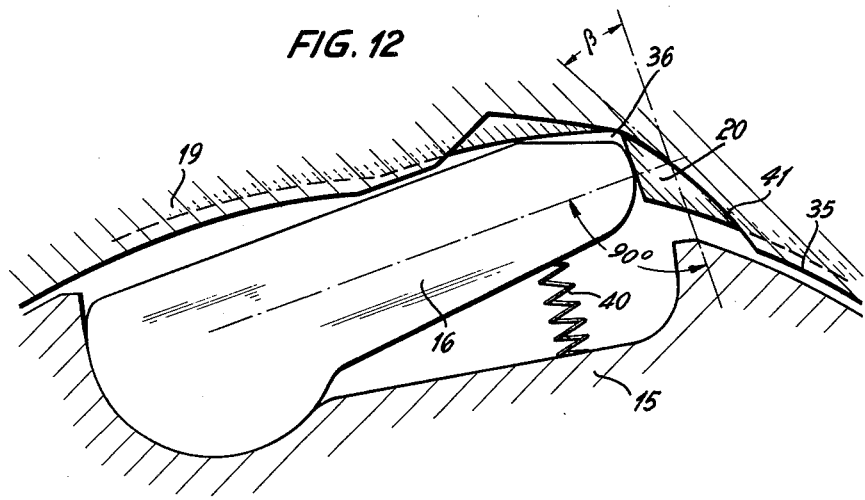
FIG. 12 is a view to enlarged scale showing the relation between a pawl of another group of pawls, on the one hand, and the toothed face and a hub part, on the other hand.
Figure 13:
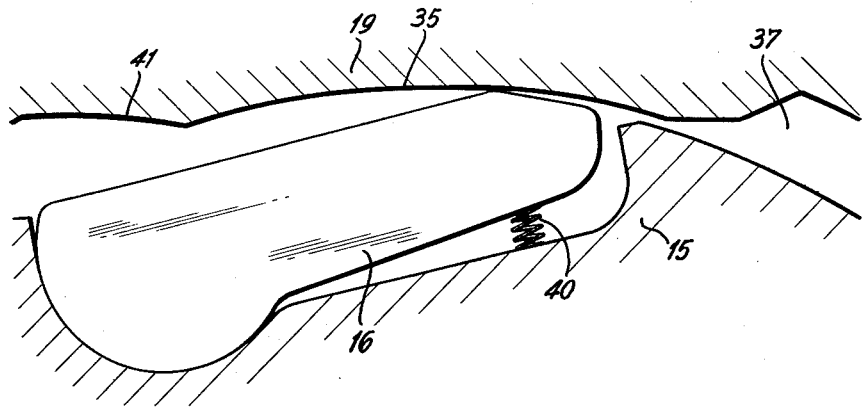
FIG. 13 shows the pawl of FIG. 12 in its relation with respect to another hub part.

In direct gear, shown in FIGS. 6, 10 and 13, the pawls 17 on the pawl carrier 15 are driven by the abutting surfaces 34 of the toothed face 19 of the ring gear 14 (see FIGS. 6 and 10). A spring 40 presses the pawls 17 against a control face 35. The pawls 16 (FIGS. 6 and 13) are held in this gear condition by the face 35 in a position in which they are prevented from engaging the toothing 36 of the ratchet ring 20. During backward turning, the toothed face 19 turns with respect to the pawl carrier 15 which is held still by the friction spring 18 together either with the cone 22 (FIGS. 1 and 2) or with the lock 25 (FIG. 3). The pawls 16 and 17 slide across the control face 35 until they get into pockets 37, and further turning is prevented either by the brake cone 22 or the lock 25. This position corresponds to the changed speed (FIGS. 7, 11 and 12).

During turning of the ring gear 14 in driving direction, each of the pawls 17 is pressed outwardly by a compression spring 40 and engages an abutting surface 33 and transmits rotary motion to the pawl carrier 15. The laterally disposed pawls 16 are taken along by the pawl carrier 15 and are in a position to engage the toothing 36 of the ratchet ring 20 (FIG. 13).

Upon renewed back-shifting into direct gear by reverse movement of the driver member 4, the pawls 17 slide with their backs over the inclines 41 in the control face 35 until they are led over the abutting surfaces 34. The pawls 16 are pressed downwardly with their tips by the inclines 41. Direct gear is again restored. Continued speed change is again prevented by the brake of FIGS. 1 and 2 or the lock 25 of FIG. 3. During forward drive, the pawls 17 (FIG. 10) and the pawls 16 (FIG. 13) resume their starting positions.

The inclines or cam faces 41 are preferably given a curved rather than a straight form so that for the disengagement of the pawls 16 an approximately uniform speed change angle $\beta$ is obtained (FIG. 12).

Figure 8:
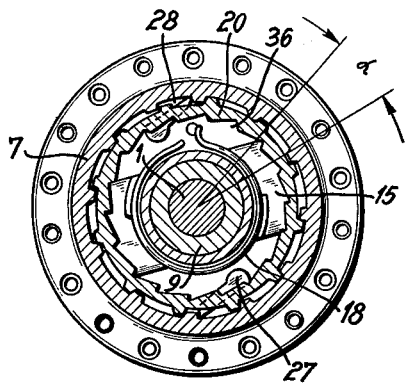
FIG. 8 is a section taken in the plane of the line VIII—VIII of FIG. 1.
Figure 9:
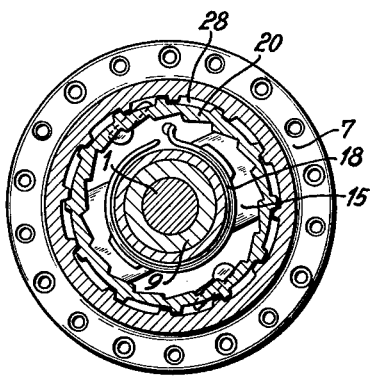
FIG. 9 is a section taken in the plane of the line IX—IX of FIG. 2.

In the embodiment shown, the pawl carrier 15 is formed so that the pawls 16 and 17 are turned by 90°. Due to this arrangement and due to the number of teeth for drive and speed control, the position of the pawls 16 according to FIG. 13 corresponds to the position of the pawls 17 according to FIG. 10, as FIG. 12 corresponds to FIG. 11. However, this is not absolutely necessary. It is possible to build a hub in which the position of FIG. 12 corresponds to that of FIG. 10. Yet, the embodiment selected for illustration has the advantage that in the gear position in which force is transmitted over the toothed face 19, the pawls 17 lie against the abutting surface 33 of the strong tooth, and that in the gear in which no force is transmitted, the pawls 17 lie against the abutting surface 34 of the weak tooth. The number of the gear teeth and driving teeth, respectively, in the cup-shaped wheel 14 may vary, but it must be divisible by the number of used pawls without a remainder, for instance, with two pawls the number of teeth may be 12, 10, 8, 6, and with three pawls the number of teeth may be 12, 9, 6. The ratchet ring 20 is connected to the hub shell 7 over a lost motion coupling 21 (FIGS. 1, 8 and 9). For the lost motion coupling 21, the ratchet teeth 28 of the hub shell 7 are preferably used, while counterteeth are chosen so that a rotary angle $\alpha$ forms (see FIG. 8).

The lost motion coupling has the task to prevent blocking of the hub during backward pushing of a bicycle with the brake applied. During freewheeling and braking, respectively, the interior parts of the hub stand still and are moved backward, respectively. The hub shell 7 continues to run forward on the ball bearings 6 and 8. The lost motion coupling 21 assumes the position shown in FIG. 8. During backward pushing, the lost motion angle α is again decreased. Briefly prior to the end of the lost motion, the pawls 27 engage the ratchet teeth 28, by which the brake is released and blocking of the hub prevented.

Reverting to FIG. 4 which shows a dual speed hub with two aggregates of driving means and a coaster brake, the hub is designed for a speed lower than the input speed and a speed equal to the input speed or direct gear. The hub is shown in the direct gear condition. A change in speed is effected on backward pedaling by the relative movement of the rotating ring 30 and the nonrotating pawl carrier 15. A sprocket 29 drives the ring gear 14" of the planetary gearing which constitutes the driver member. The cup-shaped gear 14" transmits motion over a coupling 31 to the ring 30 provided with a toothed face 19" for driving and speed change. The shifting of gears takes place as in the case of the embodiments already discussed. In direct gear, transmission of power takes place from the control ring 30 to pawls 17, a pawl carrier 15, pawls 16, a ratchet ring 20, and thence over a lost motion coupling 21 to the hub shell 7. In the low-speed gear, power is transmitted from the cup-shaped gear 14" to planet wheels of a planet wheel carrier 4", over a suitable coupling 10 to the interior driver member 9, and thence over the brake cone 22 and the pawls 27 to the hub shell 7. When a lock 25 is used, as has been described with respect to the showing of FIG. 3, the power is transmitted to the lock rather than to the brake cone.

Figure 5:
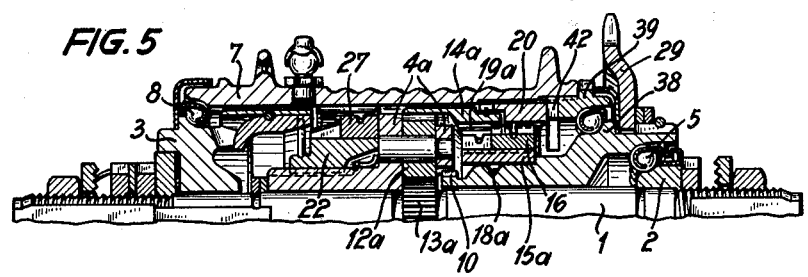
FIG. 5 shows one half of a section of still another embodiment.

The hub shown in FIG. 5 has two aggregates of driving means and a coaster brake. It is designed for direct and higher speed gear and is shown to be set for the higher speed. Speed changes are effected on back pedaling by a relative motion of a ring gear 14a and a pawl carrier 15a. While the latter rotates at the same speed as a driver member 38, the ring gear rotates at a higher speed. Thus, the relative motion necessary to a change in speed does not take place between a rotating and a stationary hub part but between two parts rotating in the same direction but at different speeds. A sprocket 29 drives the driver member 38 which is coupled to a planet wheel carrier 4a over any coupling 10. The ring gear 14a is given a higher speed over planet wheels 12a which mesh with a sun wheel 13a. The pawl carrier 15a is seated on the driver member 38 and is connected to same by a friction or clamping spring 18a. During back pedaling for the purpose of shifting gears, the pawl carrier 15a, due to the friction spring 18a, cannot turn at a higher speed than the driver member 38. Thus, the relative movement needed for the speed change, forms between the toothed face 19 of the ring gear 14a and the pawl carrier 15a. The gear actuation corresponds to that of the constructions described.

The power transmission in direct gear develops from the sprocket 29 and the driver member 38 to the planet wheel carrier 4a, and over the brake cone 22 and pawls 27 to the hub shell 7. In the high-speed gear, the transmission train includes the sprocket 29, the driver member 38, the planet wheel carrier 4a, the planet wheels 12a, and the ring gear 14a running at high speed. From the ring gear, rotary motion is transmitted over pawls 17 to the pawl carrier 15a, and over the pawls 16 to a ratchet ring 20. The latter is connected by a lost motion coupling 42 over a bearing bushing 39 to the hub shell 7.

The arrow 46 in FIG. 10 indicates the direction of the gear shift, while the arrow 47 in FIG. 10 indicates the direction of the drive.

It is believed that the construction and operation of the dual speed hub of my invention, as well as the many advantages thereof, will be fully understood from the foregoing detailed description. Some of the features are reviewed hereinafter. The invention provides a toothed face either on a ring gear of a planetary gearing, or on a part connected to the ring gear for joint rotation. The toothed face effects both driving and changes in speed. It is engaged by pawls provided on a pawl carrier. The same pawl carrier supports another series of pawls which are adapted to block motion in a direction opposite to the motion-blocking action of the first named pawls. The second named pawls engage the toothed face axially and also engage a ratchet that is connected to the hub shell. By turning the ring gear or the referred to part that is connected to the ring gear, the second named pawls are disengaged, and a shift of gears is accomplished. The hub of the invention which overcomes the drawbacks of known constructions constitutes a much simpler solution when compared with the prior constructions. Fewer parts are needed, and the parts employed are easier to manufacture and are identical with parts which are in any event used in multiple speed hubs. Essentially, the present speed change mechanism consists of a toothed face used as a drive means as well as a speed-changing means, and a pawl carrier with two groups of pawls. A change in speed is effected on back pedaling by a relative motion of the part that is provided with the toothed face, and the pawl carrier, whereby the latter either turns at a lower speed than the part with the toothed face, or stands still. Depending on the gear position, the group of pawls that forms a part of the drive means is either included in the power transmission train or switched off. My speed-changing mechanism is usable for hubs with direct and higher speed gear as well as for hubs with direct and lower speed gear.

It will be apparent that while I have shown and described my invention in a few forms only, many changes and modifications may be made without departing from the spirit of the invention defined in the following claims.

I claim:
1. Dual speed hub for bicycles, motorcycles, and the like, comprising
   (a) a stationary shaft having an axis,
   (b) a driver member rotatable about said shaft in forward and backward directions,
   (c) a hub shell supported to extend coaxially with said shaft for rotation about said axis in said directions, and
   (d) power transmission elements between said driver member and said hub shell, said elements including
      (1) planetary gearing means having a member,
      (2) a toothed face on said member,
      (3) pawl carrier means,
      (4) ratchet means, and
      (5) first and second pawls carried by said pawl carrier means, said first pawls engaging said toothed face, said second pawls engaging said ratchet means and being arranged to block motion in a direction opposite to the motion-blocking action of said first pawls, said second pawls axially engaging said toothed face and being adapted to be included in, and excluded from, the power transmission by backward turning said driver member and gear member.

2. In the hub according to claim 1, said planetary gearing means including a ring gear, and said member being constituted by said ring gear.

3. In the hub according to claim 1, said planetary gearing means including a ring gear, and said member being connected to the ring gear of said planetary gearing means for joint rotation.

4. In the hub according to claim 1, an interior driver member, said pawl carrier means including a pawl carrier member, and a part being rotatably seated on said interior driver member, spring means connecting said pawl carrier member and said part and causing said part, on back pedaling, to stand still.

5. In the hub according to claim 1, said pawl carrier including a pawl carrier member rotatably mounted on said driver member, said pawl carrier member being arranged to receive a speed higher than that of said driver member during forward pedaling, spring means connecting said pawl carrier member and said driver member and causing said pawl carrier member, on back pedaling, to decrease the speed thereof.

6. In the hub according to claim 1, the toothed face being alternately provided with spaces between adjacent teeth of different depth, said differently deep spaces causing said second pawls to engage and disengage, respectively, said ratchet means.

7. In the hub according to claim 1, said planetary gearing including a sun wheel, a ring gear, a planet wheel simultaneously meshing with said sun wheel and said ring gear, and a planet wheel carrier carrying said planet wheel, said driver member constituting the planet wheel carrier of said planetary gearing means.

8. In the hub according to claim 1, said planetary gearing including a sun wheel, a ring gear, a planet wheel simultaneously meshing with the said sun wheel and said ring gear, said driver member constituting the ring gear of said planetary gearing means.

9. In the hub according to claim 1, said toothed face being provided with curved inclines to ensure an identical speed change angle during speed changes.

10. In the hub according to claim 1, a lost motion coupling operatively interposed between said ratchet means and said hub shell, whereby blocking of the hub during backward pushing of a bicycle, motorcycle, and the like is prevented.

11. In the hub according to said claim 10, said ratchet means including a ratchet ring, said hub shell being provided with teeth, said lost motion coupling being a tooth coupling constituted by said ratchet ring and said hub shell teeth.

12. In the hub according to claim 1, an interior driver member, a first and a second coaster brake element, said first coaster brake element being threadedly connected to said interior driver member to be axially movable, on backward pedaling, against said second coaster brake element and to cause the latter to perform a braking action upon said hub shell.

13. In the hub according to claim 1, an interior driver member, a locking member, and an abutment, said locking member being threadedly connected to said interior driver member to be axially movable, on backward pedaling, against said abutment and to prevent a speed change during backward pedaling.

References Cited by the Examiner
FOREIGN PATENTS 488,281   6/18   France.
630,129  10/49  Great Britain.

DON A. WAITE, *Primary Examiner.*